(12) United States Patent
Dibble et al.

(10) Patent No.: US 6,481,935 B2
(45) Date of Patent: Nov. 19, 2002

(54) DEVICE FOR ESTABLISHING OPTIMAL MATERIAL FLOW RATE FOR UNLOADING MATERIALS

(75) Inventors: Merton L. Dibble, Kingsport; Ronald K. Dailey, Johnson City; Robert R. Stanley, Church Hill, all of TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 10/027,500

(22) Filed: Dec. 20, 2001

(65) Prior Publication Data

US 2002/0085886 A1 Jul. 4, 2002

Related U.S. Application Data

(62) Division of application No. 09/501,880, filed on Feb. 10, 2000, now Pat. No. 6,350,086.

(51) Int. Cl.[7] .............................................. B65G 53/58
(52) U.S. Cl. ....................................................... 406/83
(58) Field of Search ................................ 406/197, 198, 406/83, 194; 138/39

(56) References Cited

U.S. PATENT DOCUMENTS 4,750,524 A * 6/1988 Sekoguchi et al. ........... 138/45
5,529,093 A * 6/1996 Gallagher et al. ............ 138/44

* cited by examiner

Primary Examiner—Christopher P. Ellis
Assistant Examiner—Joe Dillon, Jr.
(74) Attorney, Agent, or Firm—Bernard J. Graves, Jr. Esq.; Jonathan D. Wood, Esq.

(57) ABSTRACT

A device for establishing an optimal material flow rate through a material convey line in which a pressurized fluid flow is used to convey material entrained within the fluid passed through the convey line is disclosed. The device includes a plate defining an orifice therein, and a latching mechanism for detachably connecting the plate to an o discharge opening of the material convey line. A gasket is disposed on a first side of the plate and extends along the periphery thereof, and is adapted to be received on and sealed to the discharge end of the material convey line when connected thereto by the latching mechanism such that the fluid flow may pass through only the orifice within the plate. The orifice is sized and shaped to establish a fluid flow backpressure within the material convey line, when the plate is connected to the material convey line, which equates generally to the transport of material therethrough for optimizing the fluid flow parameters within the material convey line without having to otherwise pass the entrained materials therethrough. The device also includes an elongate tubular body having a first end and a spaced second end, the orifice plate being affixed along its first side to the second end of the tubular body.

10 Claims, 5 Drawing Sheets

DEVICE FOR ESTABLISHING OPTIMAL MATERIAL FLOW RATE FOR UNLOADING MATERIALS

CROSS REFERENCE TO RELATED APPLICATIONS

This is a divisional patent application of, and claims priority to, U.S. patent application Ser. No. 09/501,880 filed in the United States Patent and Trademark Office on Feb. 10, 2000, since patented as U.S. Pat. No. 6,350,086 the provisions of which are fully incorporated herein by this reference.

FIELD OF THE INVENTION

The present invention relates to an apparatus and method for establishing the proper gas flow to efficiently and effectively unload materials from a storage location using a pressurized or vacuum conveying system, respectively. The present invention is ideally suited to set a proper gas flow in conveying systems used to unload friable, abrasive, or degradable materials from tank trucks.

BACKGROUND OF THE INVENTION

Plastic pellets are commonly transported from the facility at which the pellets are manufactured to bulk plastic consumers using a tank truck. Referring to FIG. 1, a common transport system will include a tank truck T, or bulk truck, which has conical hoppers H used to store the plastic pellets (not shown). To unload the truck T, a gas stream, usually air, is directed through a pipe, called a convey line C, below the conical hoppers H. The pellets are introduced into the gas stream by pressurizing the tank trailer TT and opening a hopper valve HV that separates each hopper H from the convey line C.

Still referring to FIG. 1, a positive displacement blower B, which is usually located on the tractor portion of the truck, drives the airflow in the convey line C. The blower B generates an air velocity proportional to the speed of the truck engine (not shown). The air velocity at the product pick-up point should only be great enough to entrain the solids dependably so that minimum damage is done to the solids and the unloading rate is maximized for the allowable convey line pressure.

The unloading process, however, is complicated by the fact that bulk trucks vary in performance and design, even among trucks made by the same manufacturer. For example, and as known, the tractor portion of the truck is assembled from many components manufactured by different companies, such as the transmission, the blower, and the filters. The bulk trailers, likewise, may have different pipe sizes, piping arrangements, valves, filters, and, optionally, coolers. Thus, bulk trucks lack a standard arrangement in the industry and may thus have any of a number of blower models and gearing ratios between the engine of the truck and the blower.

Further complicating the process, each different type of plastic pellet transported by the trucks has a unique entrainment velocity as well as an optimum conveying velocity for both acceptable convey rate and product degradation. The speed of the positive displacement blower, which is established by the speed of the truck engine through gearing with a predetermined power take-off ratio, determines the amount of air moved and, therefore, the gas velocity for a given pipe size.

In addition to blower speed, the velocity of the airflow is also a function of the air pressure within the pipe. System pressure results from the resistance of the system to the flow of the gas and the entrained product. That is, resistance to the flow of air and the entrained product creates a pressure differential between the two ends of the convey line. As such, the more plastic pellets that flow through the pipe at one time, the higher the resistance and thus the higher the pressure required to maintain the airflow therethrough. However, the pressure in the system compresses the air, and the resulting reduction in gas volume tends to reduce gas velocity. Accordingly, at a constant airflow, a higher pressure results in compression of the air, causing the air velocity to be lower.

The actual convey rate of the plastic pellets is determined by the allocation of the pressure resource shared between the density of the pellets flowing in the pipe and the velocity of the pellets. Thus, the operating pressure must be known or assumed before it can be determined what flow of gas will produce the desired velocity. The prior art systems do not adequately address these engineering considerations to unload bulk solids from tank trucks as efficiently as possible with the least possible damage to the material.

In the prior art systems of unloading bulk trucks, the driver first selects an operating pressure based on an acceptable temperature and the system pressure. The driver then selects a blower speed by setting the engine speed to move the amount of air that will produce the optimum velocity for the product to be handled at the desired operating pressure. To assist the operator, tables are available to select the desired pressures and velocities for the system. For example, Table 1 lists some appropriate conveying velocities and pressures:

TABLE 1

| PRODUCT NAME | TACKY TEMP (F) | PICK-UP VELOCITY (FPM) | PSI WITHOUT COOLER | PSI WITH COOLER |
|---|---|---|---|---|
| PET (Solid State) | 265 | 3600 | 11 | 12 |
| PETG (Glycol Modified PET) | 180 | 3500 | 6 | 12 |
| PET (CHDM Modified) | 255 | 3400 | 10 | 12 |
| PE (LDPE) | 210 | 4000 | 8 | 12 |
| PE (HDPE) | 255 | 3700 | 10 | 12 |

After the operator selects the proper velocity and unloading pressure from the appropriate table for the product to be moved, he or she then determines the proper engine speed based on the blower frame and the power take-off from another table. For example, Tables 2 through 5 below illustrate engine settings for popular blowers driven by three different power take-off ratios to produce three different velocities at specific operating pressures for a few plastic materials:

TABLE 2

| POWER TAKE-OFF RATIO | ENGINE SPEED (IN RPM) FOR (3500 FPM) AT 6-PSI IN 4" UNLOADING LINE | | | | | |
|---|---|---|---|---|---|---|
| 1.23 | 934 | 764 | 556 | 1747 | 918 | 593 |
| 1.41 | 815 | 666 | 485 | 1524 | 801 | 517 |
| 1.6 | 713 | 587 | 428 | 1343 | 706 | 456 |
| | GD-L9 | GD-L12 | GD-L13 | DRUM-607 | DRUM-807 | DRUM-907 |
| | BLOWER SIZE AND MANUFACTURER | | | | | |

TABLE 3

| POWER TAKE-OFF RATIO | ENGINE SPEED (IN RPM) FOR (3700 FPM) AT 10-PSI IN 4" UNLOADING LINE | | | | | |
|---|---|---|---|---|---|---|
| 1.23 | 1281 | 981 | 803 | 2103 | 1229 | 884 |
| 1.41 | 1053 | 855 | 699 | 1833 | 1071 | 770 |
| 1.6 | 927 | 752 | 651 | 1615 | 943 | 677 |
| | GD-L9 | GD-L12 | GD-L13 | DRUM-607 | DRUM-807 | DRUM-907 |
| | BLOWER SIZE AND MANUFACTURER | | | | | |

TABLE 4

| POWER TAKE-OFF RATIO | ENGINE SPEED (IN RPM) FOR (3600 FPM) AT 12-PSI IN 4" UNLOADING LINE | | | | | |
|---|---|---|---|---|---|---|
| 1.23 | 1291 | 991 | 813 | 2113 | 1239 | 894 |
| 1.41 | 1063 | 865 | 709 | 1843 | 1081 | 780 |
| 1.6 | 937 | 762 | 625 | 1625 | 953 | 687 |
| | GD-L9 | GD-L12 | GD-L13 | DRUM-607 | DRUM-807 | DRUM-907 |
| | BLOWER SIZE AND MANUFACTURER | | | | | |

TABLE 5

| POWER TAKE-OFF RATIO | ENGINE SPEED (IN RPM) FOR (3400 FPM) AT 8-PSI IN 4" UNLOADING LINE | | | | | |
|---|---|---|---|---|---|---|
| 1.23 | 1056 | 878 | 630 | 1804 | 975 | 650 |
| 1.41 | 921 | 766 | 549 | 1574 | 851 | 567 |
| 1.6 | 812 | 675 | 484 | 1387 | 750 | 500 |
| | GD-L9 | GD-L12 | GD-L13 | DRUM-607 | DRUM-807 | DRUM-907 |
| | BLOWER SIZE AND MANUFACTURER | | | | | |

After considering the applicable charts and starting the blower at the tabulated speed, the operator then adjusts the trailer valves to develop the desired operating pressure.

As one skilled in the art will appreciate, the listed tables are illustrative, and many more tables would be required to include all possible combinations and factors relevant in determining the proper unloading airflow velocity. For example, additional charts would need to address filter pressure drop and unloading pressure for each truck, in addition to more tables showing other combinations of unloading line power take-off ratios for different blower sizes and manufacturers.

In actual practice, however, the operators do not always wade through the numerous charts to tabulate the appropriate speed. Instead, engine speed is often set at the discretion of the truck driver at a value that he thinks will unload the truck at the highest rate. The driver seldom knows what blower model or power take-off ratio is installed on the truck, and he often lacks any specific training or any written procedures for loading and unloading the products. Further exacerbating the situation, it may be counterintuitive to some drivers that using a lower blower speed can actually result in unloading a bulk truck quicker than a higher blower speed. The unfortunate result of using a less efficient higher blower speed to convey plastic pellets is the generation of more fines and streamers when unloading the pellets. Another consideration is that compression of the air also increases the air temperature, which may result in product damage unless the maximum pressure is limited or a gas cooler is added.

The result of the prior art practice frequently is excessive product damage, the most common complaint from bulk plastics customers, and less than optimum unloading rates. Accordingly, there is a need in the art to allow operators to easily and accurately determine the correct conveying velocity for unloading bulk materials from a tank truck.

SUMMARY OF THE INVENTION

The present invention overcomes the drawbacks in the art and provides a device and a method that allows bulk truck engine speed (in RPM), which drives the blower, to be quickly and accurately set for the optimum gas flow for unloading any product for which the minimum entrainment velocity is known. The device is installed on the unloading pipe of the trailer, and a truck engine RPM is determined that produces a tabulated system pressure specific to the solid being handled. The device, when temporarily attached to the discharge of a gas conduit, simulates a load on the system, producing an elevated pressure that can be used to estimate gas flow in the conduit. The device is then removed and the engine speed is set at the predetermined RPM during the unloading process. Accordingly, operators of dry bulk conveying or unloading systems can dependably and repeatedly set the proper blower speed for any variable speed blower to produce optimum conveying velocity for any dry-bulk product. The present invention works effectively regardless of variations in altitude, atmospheric conditions, blower frame size, power take-off ratio, and/or operator experience.

The present invention is advantageous because it has no moving parts and requires no calibration, maintenance, additional instrumentation or power, but nevertheless produces a repeatable indication (pressure) of the gas under field conditions. In spite of the simplicity of the present invention, it can still be used with variable-rate gas moving equipment, for example with blowers, fans, compressors or gas-flow throttling mechanisms, such as valves, dampers, and the like, to repeatedly and dependably establish accurate discharge values for that system.

DETAILED DESCRIPTION

Figure 1:
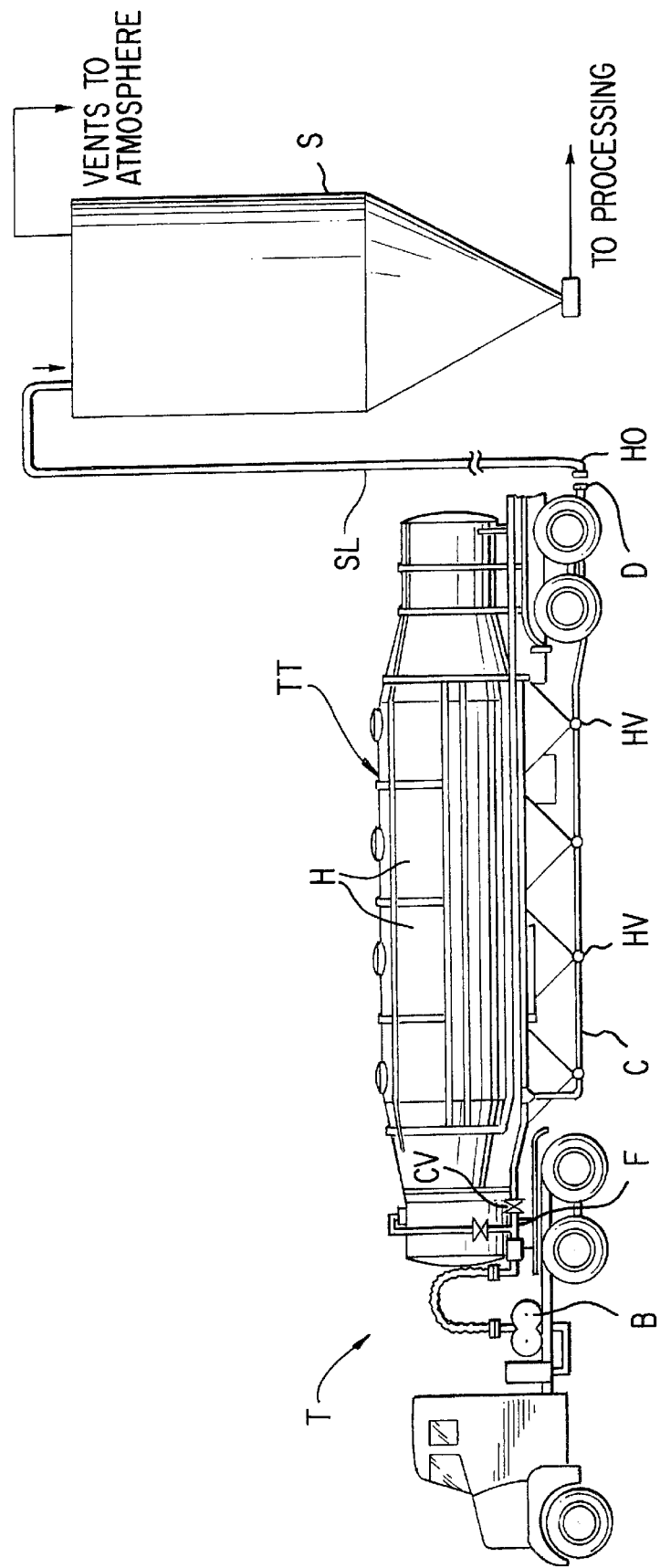
FIG. 1 is a schematic illustration of a bulk truck that is aligned to unload its payload into a silo.

The present invention is more particularly described in the following examples that are intended as illustrative only since numerous modifications and variations therein will be apparent to those skilled in the art. As used in the specification and in the claims, the words "a," "an," and "the" can mean one or more, depending upon the context in which these words may be used. The preferred embodiment is now described with reference to the figures, in which like numbers indicate like parts through the several views.

Referring generally to FIGS. 1–5, this invention provides a device and a method for establishing the proper airflow to efficiently and effectively unload bulk materials from a storage location. The present invention can be used to set air flow for pressurized or vacuum conveying systems, respectively, where an open end to which the device can be attached is available. As an example, the present invention can be used with a vacuum railcar unloading system (not shown).

In the specific exemplary embodiment discussed below, the present invention is described in the context of a bulk truck T and a pressurized conveying system. The apparatus and method allow the truck engine speed, in revolutions per minute "RPM," to be quickly and accurately set for the optimum gas flow for unloading any product for which the minimum entrainment velocity is known. The minimum entrainment velocity can often be determined from a chart, such as Table 1 listed above.

The apparatus of the present invention is a flow establishing device 10, which is shown in FIGS. 2–5 and which is adapted to be temporarily attached to the discharge end of a gas conduit. The device preferably comprises a cap 20 consisting of a plate 22 (or plate portion) and a band 50 (or a band portion). However, in a more simplistic embodiment that is not shown, the present invention comprises a plate 22 without a band being connected or joined to the plate. The present invention also comprises a means to connect the cap 20 to the discharge end D of the convey line C so that the cap 20 or plate 22 is mounted onto the discharge end D of the convey line C.

Still referring to FIGS. 2–5, the plate 22 has an edge 24 that circumscribes the plate 22, an interior surface 26 (FIG. 5), and an exterior surface 28. The interior and exterior surfaces 26, 28 are shown as being substantially planar or flat, but curved or concave surfaces are also contemplated.

Figure 2:
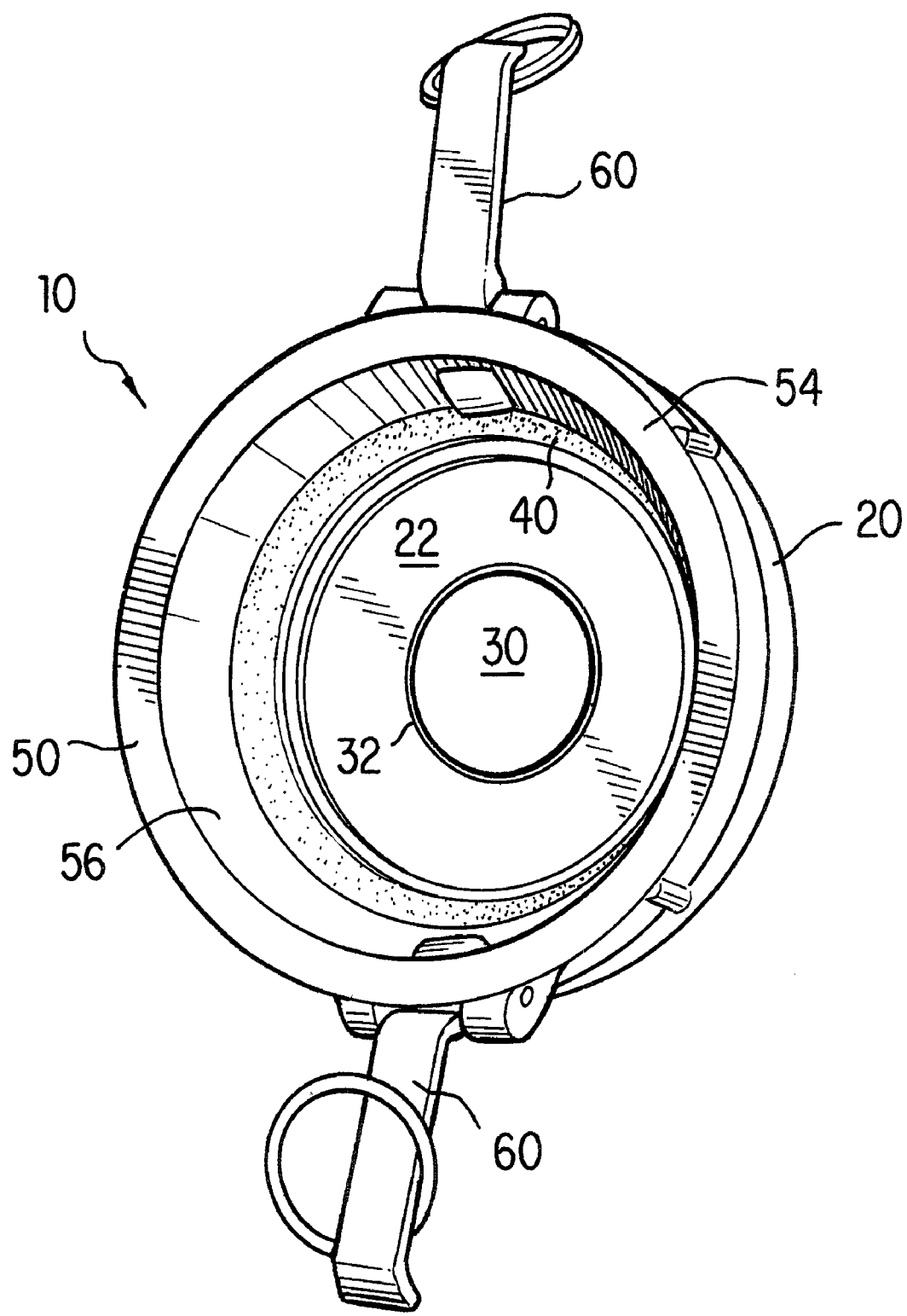
FIG. 2 is perspective view of an embodiment of the present invention showing the interior surface of the device.
Figure 4:
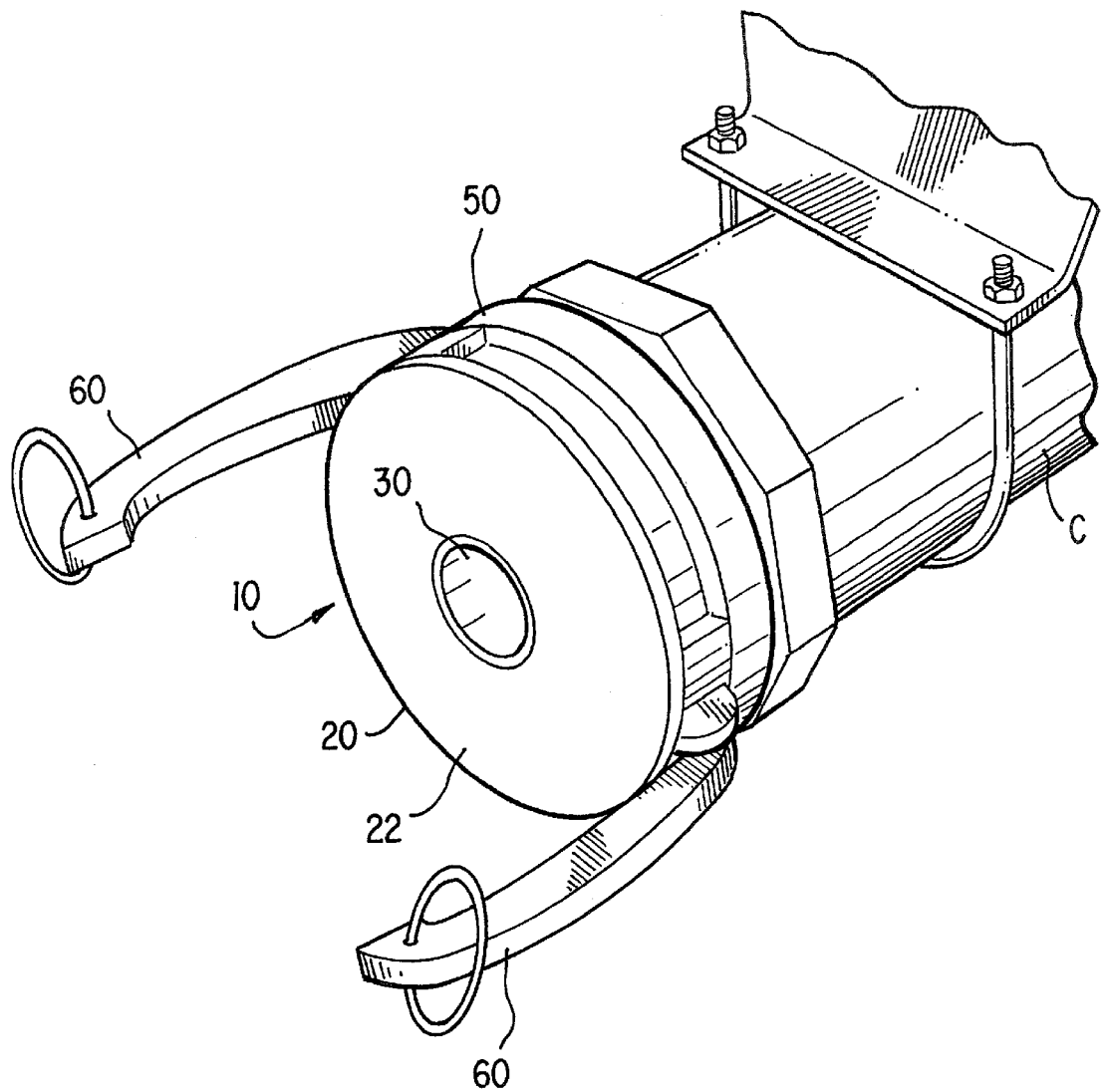
FIG. 4 is a perspective view of the device of FIG. 3 placed on the end of the convey line with the latches of the device detachably engaged with the discharge end of the convey line.
Figure 5:
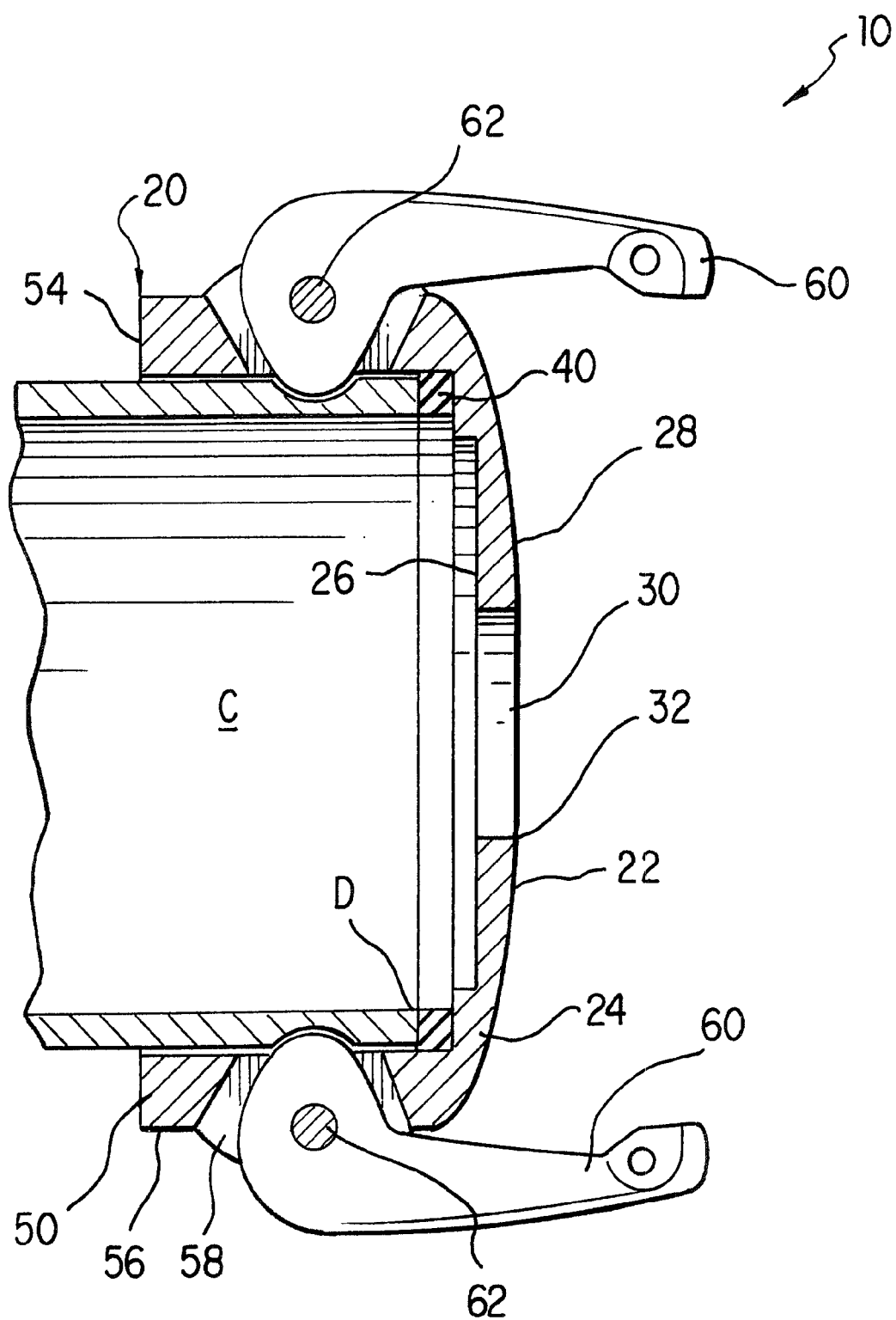
FIG. 5 is a cross-sectional view of the device of FIG. 3 showing the latches thereof detachably engaged with the discharge end of the convey line.

The plate 22 defines an orifice 30 extending through the plate that interconnects the interior surface 26 to the exterior surface 28. The orifice 30 has a periphery 32 that is disposed within the edge 24 of the plate 22 and is preferably located in the center of the plate 22. In the preferred embodiment as shown in FIG. 2, the periphery 32 of the orifice 30 is circular, but one skilled in the art will appreciate that other shapes may be used instead of a circular orifice. FIGS. 4 and 5 show that when the device 10 is mounted onto the discharge end D of the convey line C, the orifice 30 is in fluid communication with the convey line C and allows the convey line C to communicate with the atmosphere.

Figure 3:
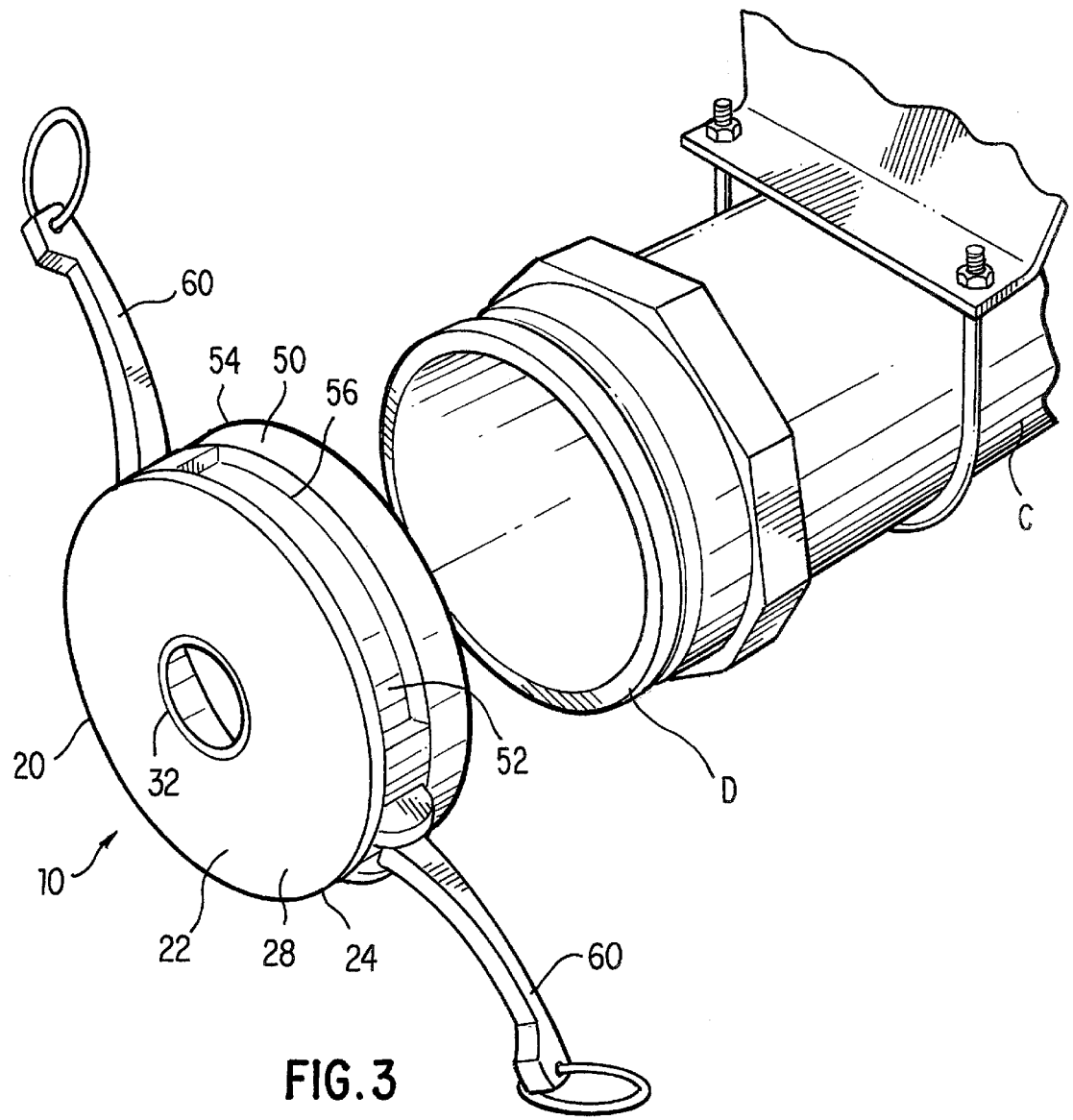
FIG. 3 is a perspective view of the device of FIG. 2 aligned to be inserted onto a discharge end of a material convey line.

The interior surface 26 of the plate 22 is of a size to complementarily engage (e.g., be mounted onto) the discharge end D of the convey line C. The edge 24 of the plate 22 can extend wider than the discharge end D, but it is important that the edges 24 should not be narrower than the discharge end D, which would allow fluid to pass between the edge 24 of the plate 22 and the side of the discharge end D and bypass the orifice 30. As best shown in FIGS. 2–4, the edge 24 of the plate 22 and the discharge end D have substantially identical dimensions and both components are circular. Nonetheless, plates having different non-circular shapes are contemplated as alternative embodiments.

It is also preferred that when the plate 22 is mounted on the discharge end D of the convey line C, a substantially fluid tight seal forms between the interior surface 26 of the plate 22 and the discharge end D. To that end, the plate 22 preferably further comprises a gasket 40 fixedly attached to the interior surface 26 of the plate 22 adjacent the edge 24. When the plate 22 is mounted onto the discharge end D of the convey line C, the gasket 40 is disposed intermediate the interior surface 26 and the discharge end D. That is, the gasket 40 assists in forming the fluid tight seal between the plate 22 and the discharge end D of the convey line C.

Thus, when the plate 22 is mounted onto the discharge end D, the only air flow out of the convey line C via the discharge end D is through the orifice 30 when the plate 22 is mounted onto the convey line C.

As noted above, the preferred embodiment comprises the plate 22 being joined to a band 50 to form a cap 20. The band 50 has a first end 52, an opposed second end 54, and a body 56 extending therebetween. The first end 52 of the band 50 terminates in the plate 22 adjacent its edge 24. As shown in FIGS. 2–5, the band 50 is integrally formed with the plate 22, i.e., the first end 52 of the band 50 is fixedly attached to the edge 24 of the plate 22 to form a unitary cap body.

The band 50, as best illustrated in FIG. 2, is the same shape in plan view as the plate 22, i.e., it is circular. The band 50 is also of a dimension to complementarily and slidably receive the discharge end D of the convey line C within [into] the body 56 of the band 50, which is shown in FIGS. 3 and 5. Referring now to FIGS. 4 and 5, when the plate 22 is mounted onto the discharge end D of the convey line C, the body 56 of the band 50 circumscribes the discharge end D.

The present invention also includes a means for detachably connecting the flow establishing device 10 to the discharge end D of the convey line C so that the plate 22 or cap 20 is mounted on the discharge end D. The preferred connecting means comprises two latches 60, specifically cam-lock latches. The latches 60 require a special fitting on the discharge end, which is shown in FIG. 3. Referring now to FIG. 5, a plurality of openings 58 extend through the body 56 of the band 50, specifically two openings 58 in the illustrated embodiment. The illustrated connecting means comprises two latches 60 as shown in FIGS. 2–5, in which each latch 60 is pivotally connected to the band 50. Each latch 60 is movable between a locked position and a released position. Referring first to FIGS. 4 and 5, the locked position is illustrated, in which a portion of the latch 60 extends through the respective opening 58 in the band 50 to contact a portion of the convey line C when the plate 22 is mounted on the discharge end D of the convey line C. In the released position shown in FIG. 3, the portion of the latch 60 that had engaged the convey line C is spaced apart from the convey line C so that the discharge end D is freely slidable into and out of the band 50.

To support the latches 60 and pivotally connect them to the band 50, the connecting means also includes one pin 62 for each respective latch (shown in FIG. 5). Each pin 62 has two opposed ends that are each securably attached to the body 56 of the band 50. A portion of each pin 62 between the opposed ends is disposed through the respective latch 60 so that the latch 60 is pivotally mounted to the band 50.

Other connecting means that can be used to connect the device to the discharge end of the convey line include, but are not limited to, the following embodiments which are not illustrated herein: threads (mated); Morris coupling; anchored straps (lanyards); magnets/electromagnets; clevis pins; adjustable clevis pins; positive lock pins; detent ring pins; detent clevis pins; ring pins; headless pins; bent arm pins; pull pins; flanges; couplings; chemical adhesives such as glue; tape; bolts/screws; set pins; cam fittings; hand clamps/manual clamps (including the following designs: pull action; squeeze action; toggle lock; straight line action; latch clamp; and production clamp); hydraulic/electric clamps; and carver clamps.

To use the flow establishing device 10 on a bulk truck T, reference is again made to FIG. 1. First, the setup steps must be performed, which do not need to occur in any specific order. One step involves the device being mounted onto the discharge end D of the convey line C at the back of the truck T with the orifice 30 allowing fluid communication between the convey line C and the atmosphere, as shown in FIGS. 4 and 5. The operator also ensures that the hopper valve HV between the convey line C and the hopper H is closed and that the convey line valve CV is in the fully opened position, i.e., 100% open. Another step performed in setting up to use the flow establishing device 10 involves connecting a blower B to the first end F of the convey line C. The blower B is capable of operating at different speeds, each speed resulting in the blower discharging gas, specifically air in this example, at a given flow rate. The air is also known as the convey gas or convey media.

For a bulk truck T as shown in FIG. 1, the prime mover of the blower B is the engine (not shown) located on the tractor. The blower B is usually a positive displacement rotary blower and, as one skilled in the art appreciates, pumps out a fixed amount of air each time the lobes (not shown) in the blower rotate, regardless of the pressure downstream in the convey line C. Thus, the rate that air is discharged from the blower B, i.e., the air flow, is a function of the speed that the lobes move, which are driven by the engine of the truck via gearing (not shown) having a set power-take off ratio. Hence, the faster the engine speed in RPM, the greater the air velocity in the convey line C. Correspondingly, based on engineering laws, the pressure in the pipe C will be proportional to the square of the air velocity.

Once the convey line C is set up as described above, the operator then starts the blower B and operates it at different speeds to obtain a predetermined, desired pressure within the convey line C between its first end F and discharge end D. A pressure gauge (not shown) is typically permanently attached to the convey line C between the blower B and the first hopper H. For a bulk truck T, the cruise control or idle of the truck engine is adjusted to achieve the desired pressure and, once obtained, the speed is recorded. Also, during the process, the convey line valve CV is not adjusted, i.e., it remains 100% open. Once the speed is recorded that results in achieving the predetermined, desired pressure, the blower B is stopped and the flow establishing device 10 is removed from the discharge end D of the convey line C.

The predetermined, desired pressure used in the above steps is product specific, and is generally best determined empirically. For example, Tables 6 and 7 below list tabulated convey line pressures specific to the solid being handled as, different materials have varying entrainment velocities, for a convey line having a four (4) inch diameter coupled with a circular orifice in the flow establishing device having a one and five-eighths (1⅝ or 1.625) inches diameter.

TABLE 6

| PRODUCT NAME | PREDETERMINED DEVICE PRESSURE | TYPICAL UNLOADING PSIG |
|---|---|---|
| PET (Solid State) | 4 | 11 |
| PETG (Glycol Modified PET) | 3 | 6 |
| PET (CHDM Modified) | 3.5 | 10 |

TABLE 7

| PRODUCT NAME | PREDETERMINED DEVICE PRESSURE | TYPICAL UNLOADING PSIG |
|---|---|---|
| PET (Solid State) | 4.5 | 12 |
| PETG (Glycol Modified PET) | 4.5 | 12 |
| PET (CHDM Modified) | 4.5 | 12 |

These two tables were developed empirically. For the specific products in these two tables, the pellets had a one-eighth (⅛) inch by one-eighth (⅛) inch square cross-section, i.e., a cube. The PETG had a weight of approximately 42 pounds per cubic foot and the PET (Solid State) and PET (CHDM Modified) had a weight of approximately 50 pounds per cubic foot. As one skilled in the art will appreciate, the determined values may vary depending on the addition of additives and/or modifiers to the chemicals comprising the pellets, i.e., change the weight or surface friction coefficient of the pellets, and may vary if the convey line configuration changes. Of course, the present invention can be used for products other than those listed in Tables 6 and 7.

If the truck T does not have a cooler, then a maximum pressure must be observed to prevent heat damage to the product as shown in Table 6. If the truck T is equipped with a cooler, then temperature is not a factor and Table 7 may be used.

One skilled in the art will appreciate that the present invention exploits the principle that an increased pressure drop occurs across an orifice when an increased mass flow of fluid passes through the orifice. For example, when air flowing through a pipe comes to an orifice in the flow path, the hole is a restriction to the flow and the upstream pressure will increase as the air is forced through the restricted opening. The pressure difference across the orifice is a function of the amount of air flowing through the hole and the amount of airflow in the pipe determines the velocity in the pipe. For the flow establishing device used on the convey line, the downstream pressure is atmospheric pressure, which is unaffected by pressure in and airflow from the convey line. Accordingly, one can determine the air velocity in the convey line simply by knowing the pressure in the line when the flow establishing device is installed.

Moreover, the present invention is accurate in different atmospheric conditions. Assuming air acts as a perfect gas, the following equation from Marks's Mechanical Engineer's Handbook is relevant to this analysis for flow though an orifice:

$$w = CA_2 p_2 \sqrt{\frac{2g}{RT_1} \frac{k}{k-1} \left(\frac{p_1}{p_2}\right)^{\frac{k-1}{k}} \left[\left(\frac{p_1}{p_2}\right)^{\frac{k-1}{k}} - 1\right]} \Bigg/ \sqrt{1 - \left(\frac{A_2}{A_1}\right)^2 \left(\frac{p_2}{p_1}\right)^{\frac{2}{k}}},$$

in which:
  A=area of section, square feet
  C=empirically determined coefficient of discharge (based on the shape of the orifice)
  g=32.2=local acceleration of gravity, foot per second$^2$
  k=$c_p/c_v$
  p=pressure of fluid at given section, pounds per square foot absolute R=perfect gas constant
T=temperature R
w=weight of fluid flowing past a given section per second, pound, and symbols having subscript "1" relate to the pipe/convey line and symbols having subscript "2" relate to the orifice. Accordingly, $A_2$ is the orifice area, so this set of equations can be used to determine convey gas flow in the pipe for a variety of orifice diameters.

For a circular orifice that is small compared to the diameter of the pipe/convey line, the denominator in the preceding equation becomes approximately equal to unity (i.e., one). For air, assuming that the values of the constants are R=53.3 and k=1.3937, the above equation reduces to:

$$w = 2.05 C A_2 p_2 \sqrt{(1/T_1)(p_1/p_2)^{0.283}[(p_1/p_2)^{0.283} - 1]}.$$

Given this relationship in the above equation, one skilled in the art will appreciate that either (1) an increase in air temperature or (2) an increase in elevation of the environment where the device is being used will result in a slight increase in pick-up velocity in the convey system for the same pressure drop across the orifice. However, when air is used as the conveying medium, these changes in operating conditions also result in reduced density of the conveying air and, therefore, decreased air momentum, or the ability to convey the pellets. The increased air velocity tends to compensate for this effect of the reduced air density. While this compensation does not maintain theoretically identical conditions, it does provide acceptable conveying conditions without reference to complex sources of specifications, data or instrumentation for measuring atmospheric conditions. Also, as one skilled in the art will appreciate, the position of the pressure gauge in the convey line can also affect the results, but this will also be negligible assuming that there is no object in the line that would create a significant pressure drop. Accordingly, the operator can determine the proper speed to operate the blower quickly and easily using the flow establishing device of the present invention.

As one skilled in the art will appreciate, the flow establishing device 10 can be fabricated to fit various pipe sizes and diameters. When using the device 10 on various pipe sizes, the appropriate pressure drop across the device 10 must be calculated such that the gas flow in the pipe provides the predetermined, desired conveying velocity for the specific product to be conveyed. For example, if the product to be conveyed requires a 3600 foot per minute minimum conveying velocity in a three (3) inch inner diameter pipe, the following equation determines the gas flow required in the line under conveying pressure:

gas flow(acfm)=(v)(pi)(r²), in which:
v=gas superficial velocity, feet/minute
pi=constant (3.14 . . . )
r=pipe radius, feet.
In this example, the gas flow would be 176.7 ft³/minute (actual cubic feet per minute).

To determine the gas flow required in standard cubic feet per minute ("scfm"), the conveying line pressure must be predetermined by testing or field experience, and the gas temperature at that pressure must be calculated. Assuming a 68 degree F standard temperature, a conveying pressure of 10 psig, and a temperature rise generated by the heat of compression from the blower of approximately 13 degrees F per pound per square inch developed, one would use the ideal gas law to determine scfm:

SCFM=ACFM(P2/P1)(T1/T2), in which:
SCFM=gas flow in ft³/min at standard conditions (T1=68 deg F, P1=14.7 psia)
ACFM=actual gas flow at P2, T2
P1, 2=pressure in psia
T1, 2=temperature in Rankine.
In this example, SCFM=(176.7 ft³/min)((10 psi+14.7 psia))((68+460 deg R)/(130+68+460 deg R))=238 scfm.

Using equations from Mark's Handbook for flow across an orifice, one can now determine the pressure in a three (3) inch inner diameter pipe required across the flow establishing device of the present invention to obtain 238 scfm in the convey line.

Continuing with the method of unloading the material from the hopper H, after stopping the blower B and removing the flow establishing device 10, the process next entails connecting the discharge end D of the convey line C on the truck T to a convey line connected to a silo S. A flexible unloading hose HO is typically used to interconnect the truck convey line C to the silo line SL. The operator then pressurizes the tank trailer to be unloaded by opening the tank valve. The blower B is also restarted by engaging the power take-off to the blower and then the blower is run based on the truck engine speed recorded when the flow establishing device was installed earlier in the process, i.e., the truck engine is operated at the same RPM as previously recorded. Once these events have occurred, the operator opens the hopper valve HV between the hopper and the convey line C so that the material passes from the hopper H, into the convey line C, out of the discharge end D, and into the silo S. As soon as the hopper valve HV is opened, the operator also sets the pressure within the convey line C to a maximum allowable pressure. If multiple hoppers H are to be unloaded, the operator first opens the hopper valve HV nearest to the cab and unloads the hoppers H in sequence moving toward the back of the trailer. After all of the hoppers H have been unloaded, the operator cycles through the hoppers H a second time to ensure that they are empty. Throughout the unloading process, the pressure in the tank trailer TT is maintained at the set, maximum allowable pressure. The precise unloading procedure used by a tank truck driver is not critical to the effectiveness of the device.

As one skilled in the art will appreciate, the present invention provides a device and method by which operators of dry bulk conveying or unloading systems can dependably and repeatedly set the proper blower speed for any variable speed blower to produce optimum conveying velocity for any dry-bulk product, in spite of variations in altitude, atmospheric conditions, blower frame size, power take-off ratio, and/or operator experience. This is because the present invention, when temporarily attached to the discharge of a gas conduit, simulates a load on the system, producing an elevated pressure that can be used to estimate gas flow in the conduit. The present invention is advantageous because it has no moving parts (except possibly the attachment means) and requires no calibration, maintenance, additional instrumentation or power, but nevertheless produces a repeatable indication (pressure) of the gas flow from a self-unloading dry bulk hopper truck under field conditions. In spite of the simplicity of the present invention, it can still be used with variable-rate gas moving equipment, for example blowers, fans, compressors or gas-flow throttling mechanisms, such as valves, dampers, and the like to repeatedly and dependably establish accurate discharge values for that system.

The present invention is described using a blower B that forces air through the convey line C. One skilled in the art will also appreciate that this illustrative example is not intended to be limiting; instead, the present invention can be used in other environments. For example, the use of gases other than air, such as nitrogen, are contemplated as the convey gas or convey media. Likewise, the prime mover or motive force of the gas stream does not have to be a blower mounted to the truck. The prime mover or motive force could alternatively be plant air, a nitrogen source, or a permanently fixed compressor or blower.

One skilled in the art will also appreciate that in addition to using the present invention to set the proper speed of the blower (or flow rate of the motive force), the present invention can also be used to verify whether the blower or other motive force is producing the appropriate fluid flow through the convey line for conveying materials, such as plastic pellets, from the source to the destination. The process involves detachably connecting the device to the discharge end of the convey line and then energizing or starting and operating the motive force. The motive force, accordingly, moves the fluid through the convey line, thus causing the pressure within the convey line to increase. The process then involves measuring the pressure within the convey line and comparing the measured pressure to a predetermined pressure, for example, Tables 6 and 7 listed above, to verify whether the motive force is producing the appropriate fluid flow for conveying materials. After the measured pressure is determined to be proper, the motive force is stopped (which is an optional step) and the device of the present invention removed from the discharge end. If the measured pressure is not proper, the system can be modified accordingly so that the proper pressure is obtained when the process is repeated, resulting in the materials being unloaded efficiently and effectively. This process can be used for a motive force that is adjustable to vary the fluid flow through the convey line or a motive force that discharges a fixed volume of fluid per unit time.

The present invention has been described in the context of a pressure conveying system, i.e., a tank truck T. As one skilled in the art will appreciate, the same principles apply for a vacuum conveying system, i.e., a vacuum railcar unloading system that similarly uses a convey line having a discharge end (or similar components). As such, the prime mover or motive force is located intermediate the first end and the discharge end of the convey line. The device 10 of the present invention is preferably detachably connected to the discharge end of the convey line downstream from the blower or other type of prime mover, but it is also contemplated to detachably connect the device to the first end of the convey line in a vacuum system.

Although the present invention has been described with reference to specific details of certain embodiments thereof, it is not intended that such details should be regarded as limitations upon the scope of the invention except as and to the extent that they are included in the accompanying claims.

What is claimed is:

1. A device adapted for use in establishing an optimized flow rate through a material convey line in which a pressurized fluid flow is used to carry the material entrained within the fluid passed therethrough, the material convey line having a discharge opening, the device comprising:
   a plate;
   an orifice defined within and extending through the plate;
   a gasket disposed on a first side of the plate and extending along the periphery thereof; and
   means for detachably connecting the plate to the discharge opening of the convey line.

2. The device of claim 1, wherein the plate is sealed to the discharge opening of the material convey line when connected thereto by said means for connecting.

3. The device of claim 2, the orifice being sized and shaped to establish a fluid flow backpressure within the material convey line when the plate is connected thereto.

4. The device of claim 2, the orifice being sized and shaped to establish a fluid flow backpressure within the material convey line equating to the transport of material therethrough when the plate is connected to the material convey line.

5. The device of claim 2, further comprising an elongate tubular body having a first end and a spaced second end, said plate being affixed along its first side to the second end of said tubular body.

6. The device of claim 5, said tubular body being sized and shaped to be passed over the discharge opening of the material convey line.

7. The device of claim 5, said tubular body and said plate being sealed on the discharge opening when connected thereto by said means for connecting.

8. A device adapted for use in establishing an optimized flow rate through a material convey line in which a pressurized fluid flow is used to convey the material entrained within the fluid passed through the convey line, the material convey line having a discharge opening, the device comprising:
   an elongate tubular body having a first end and a spaced second end;
   a plate having a first side affixed to the second end of said tubular body;
   a gasket disposed on the first side of the plate and extending along the periphery thereof within said tubular body;
   an orifice defined within and extending through said plate; and
   means for detachably connecting the tubular body to the discharge opening of the convey line.

9. The device of claim 8, the orifice being sized and shaped to establish a backpressure within the material convey line equating to the transport of material therethrough when the plate is connected to the material convey line by said means for connecting.

10. The device of claim 8, wherein the plate is sealed on the discharge opening when the tubular body is connected thereto by said means for connecting.

* * * * *

UNITED STATES PATENT AND TRADEMARK OFFICE
CERTIFICATE OF CORRECTION

PATENT NO. : 6,481,935 B2
DATED : November 19, 2002
INVENTOR(S) : Merton L. Dibble, Ronald K. Dailey and Robert R. Stanley It is certified that error appears in the above-identified patent and that said Letters Patent is hereby corrected as shown below:

Column 12,
Line 24, delete "claim 2" and replace with -- claim 1 --.

Signed and Sealed this

Eighth Day of April, 2003

JAMES E. ROGAN
*Director of the United States Patent and Trademark Office*